United States Patent
Nakaoka et al.

(10) Patent No.: US 6,893,511 B1
(45) Date of Patent: May 17, 2005

(54) PRODUCTION METHOD FOR SEMIRIGID MAGNETIC MATERIAL AND SEMIRIGID MATERIAL AND MAGNETIC MARKER USING IT

(75) Inventors: Noriyuki Nakaoka, Yasugi (JP); Akira Kawakami, Matsue (JP); Hideya Yamada, Yasugi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 09/530,694

(22) PCT Filed: Sep. 10, 1999

(86) PCT No.: PCT/JP99/04926

§ 371 (c)(1),
(2), (4) Date: May 4, 2000

(87) PCT Pub. No.: WO00/16346

PCT Pub. Date: Mar. 23, 2000

(30) Foreign Application Priority Data

Sep. 10, 1998 (JP) .......................................... 10-257180

(51) Int. Cl.[7] .................................................. H01F 1/00
(52) U.S. Cl. ..................... 148/121; 148/120; 428/611; 428/692
(58) Field of Search ............................... 148/120, 532, 148/534, 579, 527, 529, 101, 121, 122, 516; 428/611, 615, 676, 212, 692; 228/195

(56) References Cited

U.S. PATENT DOCUMENTS

| | | | | |
|---|---|---|---|---|
| 4,025,379 A | * | 5/1977 | Whetstone | 148/101 |
| 5,156,923 A | | 10/1992 | Jha et al. | 428/614 |
| 5,628,840 A | | 5/1997 | Hasegawa | 148/304 |
| 5,716,460 A | * | 2/1998 | Manning et al. | 148/120 |
| 6,001,194 A | * | 12/1999 | Nakaoka et al. | 148/306 |
| 6,045,927 A | * | 4/2000 | Nakanishi et al. | 257/712 |
| 6,372,062 B1 | * | 4/2002 | Masahiro et al. | 148/527 |

FOREIGN PATENT DOCUMENTS

| | | | |
|---|---|---|---|
| EP | 0 806486 A | 11/1997 | |
| EP | 0 875874 A | 11/1998 | |
| JP | 51-18884 | 6/1976 | ........... C22C/38/52 |
| JP | 58-153758 A | * 9/1983 | |
| JP | 58-181823 A | * 10/1983 | |
| JP | 8-82285 | 3/1996 | ........... F04B/39/06 |
| JP | 8-87237 | 4/1996 | ............. G09F/3/00 |
| JP | 08 283856 A | 10/1996 | |
| JP | 8-283857 | 10/1996 | ............ C21D/8/12 |
| JP | 09-32361 A | * 12/1997 | |
| JP | 2000-71081 | 3/2000 | |

OTHER PUBLICATIONS

JPO Abstract Translation of Endo (Clipped Image No. JP358181823A).*
JPO Abstract Translation of Nishimura et al. (Clipped Image No. JP406100998A).*
JPO Abstract Translation of Katsumata (Clipped Image No. JP358153758A).*

(Continued)

*Primary Examiner*—Paul Thibodeau
*Assistant Examiner*—Kevin M. Bernatz
(74) *Attorney, Agent, or Firm*—Sughrue Mion, PLLC (57) ABSTRACT

The invention relates to a semi-hard magnetic material having rectangular hysteresis loop and superior magnetization steepness and a method of producing a bias material preferably used for a magnetic marker. This method comprises the steps of preparing a multilayer clad material in which layers "A" each containing Fe as the main component thereof and layers "B" containing as the main component thereof a Cu group metal are diffusion-bonded, heating the multilayer clad material, subjecting the material to a dividing treatment, and applying cold working thereto. By this method, it becomes possible to obtain the semi-hard magnetic material having high squareness ratio and superior magnetization steepness, and to obtain the bias material for the magnetic marker.

10 Claims, 8 Drawing Sheets

METAL STRUCTURE OF SAMPLE No.17 OF THE INVENTION

10 μm

OTHER PUBLICATIONS

Derwent Abstract Translation of TOHM (Derwent Acc. No. 1983–836733).*
JPO Abstract Translation of JP 09–32361A (Clipped Image No. JP409312361A).*
English Translation of JP 58–181823 A (PTO).*
Derwent Publication Ltd., London, GB; AN 1974–37308V XP002237135 & JP 49 015616 A(Nippon Telegraph & Telephone Corp), Feb. 12, 1974.

"Heat Treatment" vol. 38, No. 2, pp. 75–79, *Fabrication and Mechanical Properties of Super-laminates*, issued Apr. 1998.

International Search Report.

Patent Abstract of Japan JP–A–2000–71081 Mar. 07, 2000.

* cited by examiner

METAL STRUCTURE OF COMPARATIVE SAMPLE No.21

METAL STRUCTURE OF ONES EACH SUBJECTED TO DIVIDING TREATMENT (A)

METAL STRUCTURE OF SAMPLE No.7 OF THE INVENTION (A)

METAL STRUCTURE OF SAMPLE No.17 OF THE INVENTION (A)

10 μm (B)

10 μm (C)

5 μm

FIG. 6   RESULT OF MEASURING MAGNETIC CHARACTERISTIC REGARDING No.7 OF THE INVENTION

FIG. 7   RESULT OF MEASURING MAGNETIC CHARACTERISTIC REGARDING No.17 OF THE INVENTION

FIG. 8
RESULT OF MEASURING MAGNETIC CHARACTERISTIC REGARDING No.21 OF THE INVENTION

FIG. 9

MAGNETIC MARKER

PRODUCTION METHOD FOR SEMIRIGID MAGNETIC MATERIAL AND SEMIRIGID MATERIAL AND MAGNETIC MARKER USING IT

TECHNICAL FIELD

The invention relates to a semi-hard magnetic material used for relays and bias materials of a magnetic marker, a method of producing the semi-hard magnetic material, and a magnetic marker using the semi-hard magnetic material.

A semi-hard magnetic material which can maintain a magnetized state and which can also be demagnetized has been used as a material for relays. As a representative semi-hard material, there is known a Fe—Cr—Co based alloy, etc., as disclosed in JP-B-51-18884.

As regards the semi-hard magnetic material, there have been proposed various alloys other than the above Fe—Cr—Co based alloy, in view of various required magnetic characteristics such as coercivity, saturation magnetic flux density, etc.

Further, regarding the use of the semi-hard magnetic material, it is possible to utilize it for producing a bias element for a magnetic marker as is to be used for monitoring articles, as disclosed in JP-A-8-82285. This bias element is combined with a magnetostriction element made of an amorphous magnetic material, etc., so that it may be used to regulate magnetostrictive vibration.

A semi-hard magnetic material used as a bias material for relays or magnetic markers is required to have easiness of regulating coercivity, high saturation magnetic flux density, and clearness of the on-off of a magnetized state and another demagnetized state.

With respect to the material having the clearness of the on-off, this means that it is possible to observe that the semi-hard material has a rectangular hysteresis loop and a squarish corner regarding each quadrant of the B-H curve, with the result that the shape of the B-H curve is similar to or approaches a rectangle (, which is called below "magnetization steepness"). With respect to the fact that the corner is squarish, this means that in a magnetic material the displacement of domain walls and the rotation of magnetic domains occur simultaneously by an applied magnetic field of a predetermined intensity.

As one of the semi-hard materials, the present inventors have found a Fe—Cu based alloy which is separated into two phases because these two elements show low solid-solubility with respect to each other. The Fe—Cu based alloy is known to have easiness regarding the regulating of coercivity by adjusting the amount of a non-magnetic Cu phase to be dispersed in a matrix containing as the main constituent thereof Fe, which Fe exhibits magnetism.

However, in a case of actually producing the semi-hard magnetic material of Fe—Cu based alloy by use of a melting process, since there is a large difference between the solidification points of Fe and Cu, there have occurred such problems as Cu is condensed at the central portion of an alloy ingot when the ingot is made and as the ingot is inferior in workability and particularly in hot-workability due to the separation of the Cu phase with the result of the occurrence of cracks, so that this material is far from the mass production thereof insofar as a method of plastically working the ingot of the material is concerned.

On the other hand, as a method of producing a composite body of different kinds of metals, there is known, as disclosed in "Heat Treatment" Vol. 38, No. 2, pages 75 to 79, issued in April, 1998, a method using a multilayer metal body, comprising the steps of providing a layered body of different metals, and repeating the rolling of the layered body so that the multilayer metal body may be produced.

In a case of applying this method to an Fe—Cu based alloy, since sheets of Fe and Cu are stacked, it is possible to overcome such difficulties in ingot-formability and in workability. Thus, in this multilayer metal body, there occurs such a structure as Fe and Cu are layered with very small intervals, so that the coercivity thereof become somewhat enhanced.

However, in this multilayer metal body, Cu exists in the state of a foil, so that it is not sufficient as a semi-hard magnetic material. Of course, raising a ratio of Cu existing therein makes it possible to raise the coercivity, however, it will lead to the drop of the saturation magnetic flux density thereof.

DISCLOSURE OF THE INVENTION

In view of the above-explained problems, the object of the invention is to obtain a method of producing a novel, semi-hard magnetic material, the semi-hard magnetic material produced by the method which material has a superior magnetic characteristic, and a magnetic marker using the semi-hard magnetic material.

The present inventors have repeated researches of multi-layered (hereinafter often just "multilayer") metal structure of Fe and Cu in order that a semi-hard magnetic material may be produced from the Fe—Cu multilayer material. As a result thereof, the present inventors found out a surprising phenomenon that, by heating the Fe—Cu multi-layered metal body, Cu layers are agglomerated to become spheres, with the result that the Cu layers are divided into a discrete phase fine in size, namely, the Cu layers are segmented substantially sheet-like layers.

Further, the present inventors found that cold working of the structure having the discrete, fine Cu phase makes the structure anisotropic and remarkably raises the coercivity thereof Namely, according to the first aspect of the invention, there is provided a method of producing a semi-hard magnetic material, comprising the steps of preparing a multilayer body in which both a layer "A" containing Fe with magnetism as a main constituent thereof and another layer "B" containing a non-magnetic metal of the Cu group are stacked, heating the multilayer body so that the layer "B" may be divided into discrete phases, and performing the cold working thereof As regards the dividing treatment, it is preferred to perform the Cu layer-dividing treatment at a holding temperature of 680 to 1085° C. for a holding period of 10 to 180 minutes.

In the present invention, it is preferred to perform a magnetization steepness-generating heat treatment for enhancing the squareness ratio and the magnetization steepness, and it is preferred to perform the magnetization steepness-generating heat treatment at a holding temperature of 400 to 700° C. for a holding period of 2 to 120 minutes.

According to the second aspect of the invention, there is provided a method of producing a semi-hard magnetic material which is a sheet having a thickness of 0.03 to 1.0 mm by cold working.

The semi-hard magnetic material of the invention has a structure where a plurality of layers "B" each including partially divided, striplike portions of Cu as the main component thereof are laminated with the layer "A" being interposed therebetween.

According to the third aspect of the invention, there is provided a magnetic marker produced by locating the semi-hard magnetic material of the invention so that a bias magnetic field may be applied to the magnetostriction element of the magnetic marker.

THE BEST MODE FOR WORKING THE INVENTION

The basic technique of the invention resides in the respect that, by the steps of dividing through the heat treatment the Cu layers of the multilayer body having the stacked layers of Fe and Cu, and cold working to make the structure anisotropic, the properties of coercivity, squareness ratio and magnetization steepness thereof are enhanced.

The invention is explained in detail below.

In the multilayer body which is a blank in the invention, the layer "A" containing the main component of Fe which exhibits magnetism is necessary to keep basic, magnetic characteristics. As the layer "A" containing the main component of Fe which exhibits magnetism, it need not be pure iron, and deoxidizing elements, Al and/or Si and/or Mn, may remain in the layer "A" as occasion demands. In addition, corrosion resistive elements, Cr and etc., or C contributing to strength may be contained in the layer "A".

Further, in the invention, as the layer "B", not only pure Cu but also a non-magnetic metal of the Cu group, that is, Cu or Ag or Au may be used in the state of a simple substance or an alloy. These elements are hardly dissolved in Fe and exist in the structure as the second phase which impedes the displacement of the magnetic domain walls and/or the rotation of the magnetic domains, whereby these elements have such a function as to enhance the coercivity. Of course, the phase of the non-magnetic metal of the Cu group may contain a slight amount of other components and/or additives dissolved in the non-magnetic metal of the Cu group.

In the Cu group elements, since Cu can be obtained cheapest, it is most preferred to use Cu.

The multilayer body may be made, for example, by the steps of: stacking alternately both of a metal sheet containing as the main component thereof Fe which exhibits magnetism which becomes the layer "A" and another non-magnetic metal sheet of a Cu group element; and bonding the layers to each other by hot, hydrostatic pressing or by hot rolling or by the combination of them, etc. In addition to these steps, cold rolling may be added.

In order to enhance the coercivity, it is preferred to distribute Cu of a fine a size as is possible, and it is desired that the non-magnetic metal layer of the Cu group, which is the raw material of the multilayer body, be as thin as possible. For making these possible, there is a method having the steps of stacking a plurality of multilayer bodies each having been previously produced by stacking and thinning, and bonding these, and another method having the steps of pressing thickness-wise a multilayer body having more stacked layers.

As regards the regulation of the required coercivity, this regulation is readily performed by changing the combination of the metal sheet containing as the main component thereof Fe having magnetism which metal sheet becomes the layer "A" with the other non-magnetic, Cu group metal sheet which becomes the layer "B", which regulation is one of the features of the invention.

In this case, regarding the non-magnetic Cu group metal sheets which become the layers "B", it is preferred to regulate the ratio of a non-magnetic Cu group metal contained in the multilayer body so that the content thereof may be in the range of 3 to 30 mass %, and more preferably it is in the range of 8 to 20 mass %

By heating up to a proper temperature the multilayer body obtained by the various methods explained above; in which the layers of both of Fe and a non-magnetic Cu group metal are stacked, each of the layers "B" is divided, which treatment is called "a dividing treatment" in this invention.

The temperature of the dividing treatment is preferably a temperature between the melting point of the non-magnetic Cu group metal and a level lower about 300° C. than it, such as 685 to 1085° C., in a case of using Cu as the non-magnetic Cu group metal.

By heating the multilayer body up to this temperature range, it is possible to finely divide the Cu layers. Thus, when the sectional structure of the multilayer body is observed, a plurality of partially divided, sheet-like Cu layers are stacked (, that is, laminated) while interposing therebetween layers "A" having magnetism.

Further, regarding the holding period of time in the dividing treatment, a short period may be adopted in a case where the heating temperature is high. However, since an insufficient period of time does not divide the Cu layers sufficiently, it is preferred to adopt the holding period of time of at least about 10 minutes. Further, since a too long a holding period of time impedes the producibility thereof, the holding period of time may be about 180 minutes at most, and more preferably it is in the range of 30 to 60 minutes. Furthermore, if the holding period of time is regulated to be about 5 minutes while preventing the Cu layers from melting and flowing out of the edges of the multilayer body, the multilayer body may be held at a temperature not less than the melting point of Cu, that is, about 1085 to 1200° C.

Then, by cold working the heated body, magnetic anisotropy is applied to the body so that the properties of coercivity, squareness ratio and magnetization steepness can be enhanced. Namely, the divided, non-magnetic Cu group metal layers are elongated by the plastic working such as rolling or drawing, and it becomes possible to obtain such a structure as longitudinally elongated, non magnetic ranges are dispersed while having a width in a direction vertical to the rolling or drawing direction. By more finely dividing the non-magnetic layers "B", it becomes possible to remarkably enhance the coercivity in comparison with a case where Cu exists as complete sheets.

Further, by this plastic working, it is possible to proceed with the texturing of the matrix containing as the main component thereof Fe having magnetism. By proceeding with the applying of the plastic working to the alloy containing as the main component thereof Fe having magnetism, the material becomes to have a texture. In a case where cold rolling is adopted as the plastic working, the rolling direction becomes the <110> direction, and there occurs the texture of {001} <110> and {112} <110>. Also, in the invention, the textures of {100} <110> and {112} <110> are formed regarding the layer "A" having magnetism. Further, since the non-magnetic layers "B" are finely divided by the dividing treatment, the cold rolling applied (as one plastic working) to the structure brings about such a structure as a plurality of partially broken, sheet-like layers "B" are stacked in the texture of the matrix containing as the main component thereof Fe having magnetism. The forming of the texture leads to restrict the kinds of the factors which impede the displacement of the domain walls and/or the rotation of the magnetic domains, so that the displacement of the magnetic domain walls and/or the rotation of the magnetic domains come to occur simultaneously at a certain magnetic field applied thereto. Namely, the squareness ratio and the magnetization steepness are enhanced.

In the semi-hard magnetic material of the invention, it is preferred for the thin sheet to have a thickness of 0.03 to 1.0 mm. By providing this level of thickness, when this material is used as the bias material of a magnetic marker, the magnetic marker can be formed to have a small-size design. Further, it goes without saying that a bar-like or rod-like shape as well as the sheet-like shape may be adopted, however, regarding the cold working, the cold rolling is superior to other processes such as drawing, etc., in respect of productivity. Regarding the thickness of the material, the thinner the material, the more readily the small design of the magnetic marker becomes possible, although it depends on the magnitude of an intended bias magnetic field and on the usage thereof.

In addition, in the present invention, by performing a steepness-affording heat treatment for enhancing the squareness ratio and the magnetization steepness by heating the material after the cold plastic working, it becomes possible to further improve the magnetic characteristics. This heat treatment is usually called "an aging treatment". In a case where there is much strain by the plastic working remains in the material, the displacement of the magnetic domain walls and the rotation of the magnetic domains in the matrix come to be impeded, although the matrix containing Fe as the main: component thereof inherently has superior soft magnetism. In this state of the semi-hard magnetic material, the squareness thereof becomes small and the shape of the B-H curve becomes gently-sloping, that is, the squareness and the magnetization steepness of the material are inferior.

Thus, by the aging treatment, the strain of the matrix can be relieved, so that the displacement of the magnetic domain walls and/or the rotation of the magnetic domains may be easy, and the main factors impeding the displacement of magnetic domain walls and/or the rotation of the magnetic domains may be limited to the non-magnetic Cu group metal dispersed in the material, whereby it becomes possible to obtain such a semi-hard magnetic material as to have enhanced squareness ratio and a B-H curve approaching a rectangular shape (, that is, good magnetization steepness). Thus, in the invention, the aging treatment is called "steepness-affording heat treatment" in view of the meaning that the aging treatment brings about enhanced magnetization steepness.

The magnetization steepness is a particularly important factor as one of the characteristics required in the magnetic marker, and the ratio of $Br/B8k$ is preferred to be not less than 80% (, in which the Br is residual, saturation magnetic flux density, and in which the B8k is magnetic flux density in the magnetic field of 8000 A/m). The holding temperature of the steepness-affording heat treatment is preferred to be in a range of 400 to 700° C. In a case where the holding temperature is too low, it become impossible to sufficiently relieve the strain of the matrix having magnetism. Thus, the more preferable holding temperature is in a range not less than 450° C. In another case where the holding temperature is too high, the divided, non-magnetic Cu group metal layers agglomerate to each other to become coarse in size, with the result that there occurs such a fear as the effect of impeding the displacement of the magnetic domain walls and/or the rotation of the magnetic domains can not be obtained sufficiently. Thus, the more preferable holding temperature is in a range of 450 to 600° C.

The holding period for the steepness-affording heat treatment is preferred to be in a range of 2 to 120 minutes. In a case where the holding period is too short, it becomes impossible to sufficiently relieve the strain of the matrix having magnetism. Thus, the more preferred holding period is not less than 3 minutes. However, in another case where the holding period is too long, the divided, non-magnetic layers "B" agglomerate to each other to become coarse in size, with the result that there occurs such a fear as the effect of impeding the displacement of the magnetic domain walls and/or the rotation of the magnetic domains can not be obtained sufficiently. Further, in view of the productivity, the holding period is preferred to be as short as possible. Thus, the more preferred holding period is not more than 60 minutes.

Figure 4:
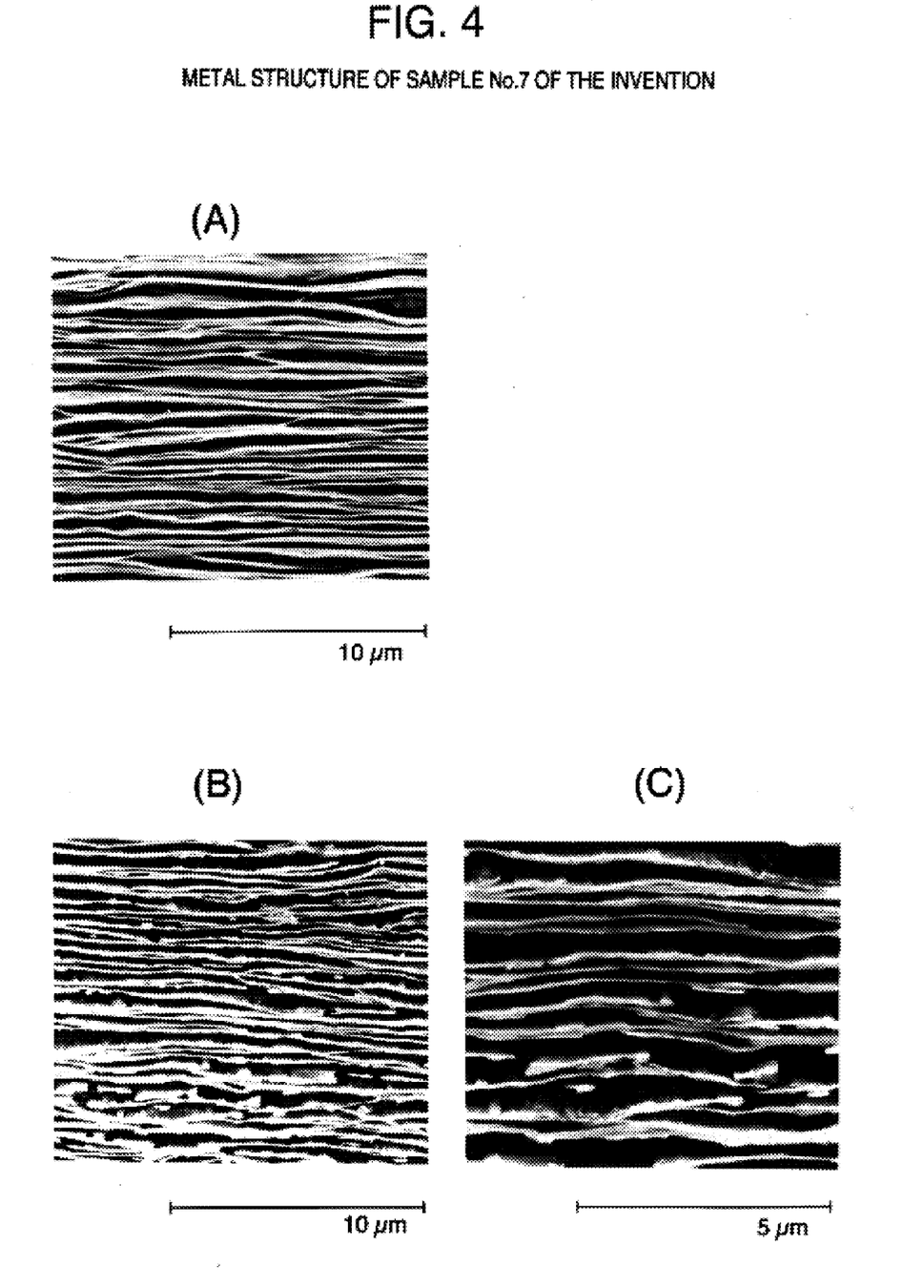
FIG. 4 is a photograph of a metal structure of another semi-hard magnetic material of the invention.
Figure 9:
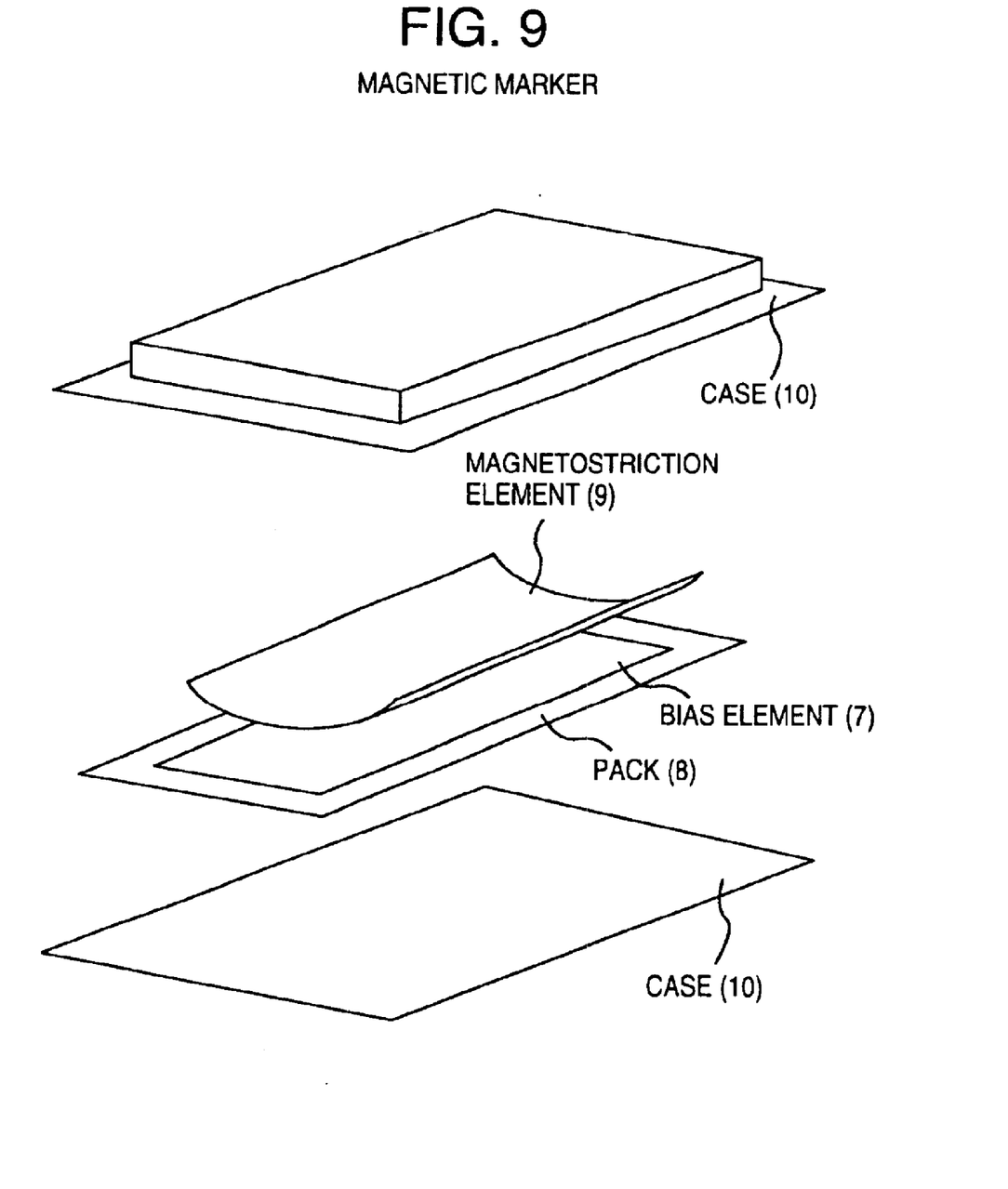
FIG. 9 is a perspective view showing one example of the structure of a magnetic marker in which a bias material of the invention for the magnetic marker is combined.

By use of the above explained method, the semi-hard magnetic material comes to have such a structure as, when viewing the sectional structure thereof, a plurality of partially divided, sheet-like layers "B" including as the main component thereof Cu are stacked on each other through the layers "A" including as the main component thereof Fe having magnetism. One specific example thereof is a metal structure shown in FIG. 4. This semi-hard magnetic material is superior in the squareness ratio and the magnetization steepness, and particularly it becomes a material preferred as a bias material for a magnetic marker. That is, the semi-hard magnetic material of the invention is combined, as a bias element (7), with a magnetostrictive element (9), for example as shown in FIG. 9, so that a magnetic marker is produced.

As one specific example, the magnetostrictive element is regulated to have a thickness of 0.03 mm, a width of 6 mm and a length of 38 mm, and the bias element (7) is regulated to have a thickness of 0.05 mm, a width of 6 mm and a length of 32 mm so that an intended bias magnetic field may be applied to this magnetostriction element. The bias element (7) is then backed with resin or is interposed between resin sheets so that a pack (8) may be formed, which pack (8) is located in the vicinity of the magnetostriction element (9) made of an amorphous material and is sealed in a plastic case (10) comprising an upper lid provided with a recess and a lower lid, whereby the magnetic marker is formed. As the magnetostriction element, it is necessary to select, in compliance with the magnetic field obtained in the semi-hard magnetic material, the amorphous alloy, etc., disclosed in U.S. Pat. No. 5,628,840. Further, although in this example the bias element and the magnetic marker both having a sheet shape are disclosed, a bar-like or column-like shape may be used.

(Embodiments)

Figure 1:
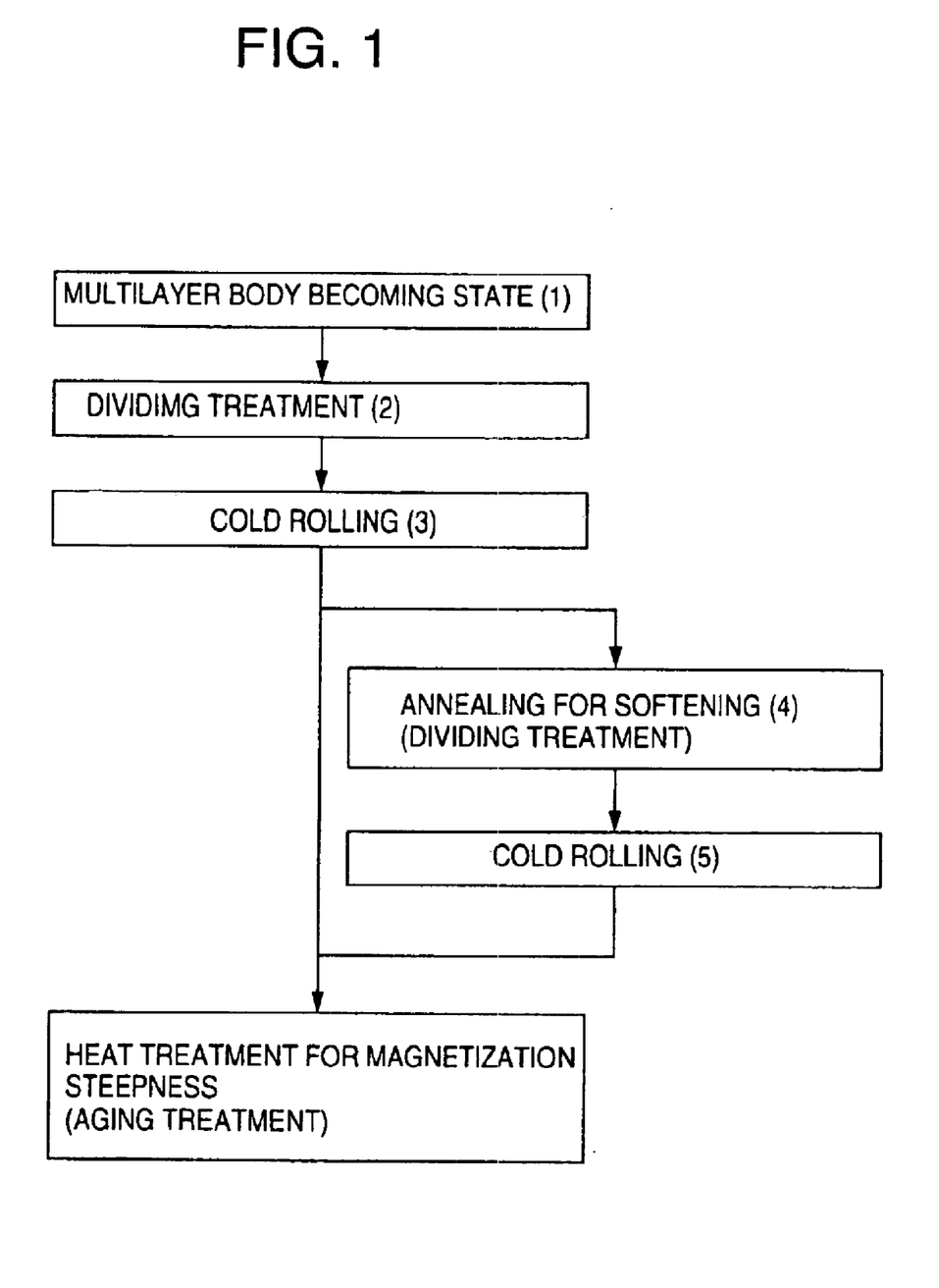
FIG. 1 is a diagram showing the steps of producing the semi-hard magnetic material of the invention.

The basic steps of the method for producing the semi-hard magnetic material of the invention is shown in FIG. 1.

Figure 2:
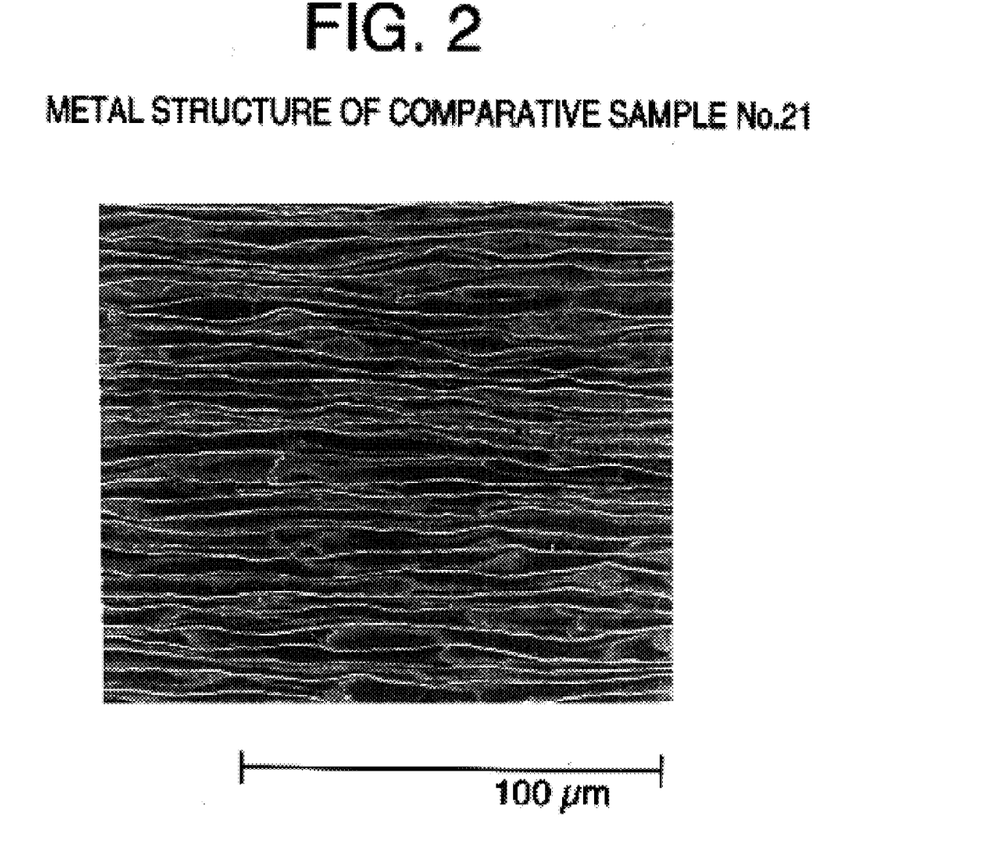
FIG. 2 is a photograph showing a micro-structure of a comparative semi-hard magnetic material.

Electromagnetic, mild iron thin sheets and oxygen-free copper sheets were stacked to thereby provide a composite material including 13% Cu in terms of mass ratio, the composite material being then hot-rolled to provide a rolled product. A plurality of rolled products were then stacked and hot-rolled, whereby a multilayer body (1) was obtained which was used as the blank of the invention having a thickness of 3 mm and a layered, sectional structure as shown in FIG. 2. In FIG. 2, it is observed that the layers each appearing to be black in color and each containing as the main component thereof Fe having magnetism and the other layers each appearing to be white in color and each containing as the main component thereof Cu are stacked and alternated with each other. The number of those layers was about 1500.

Figure 3:
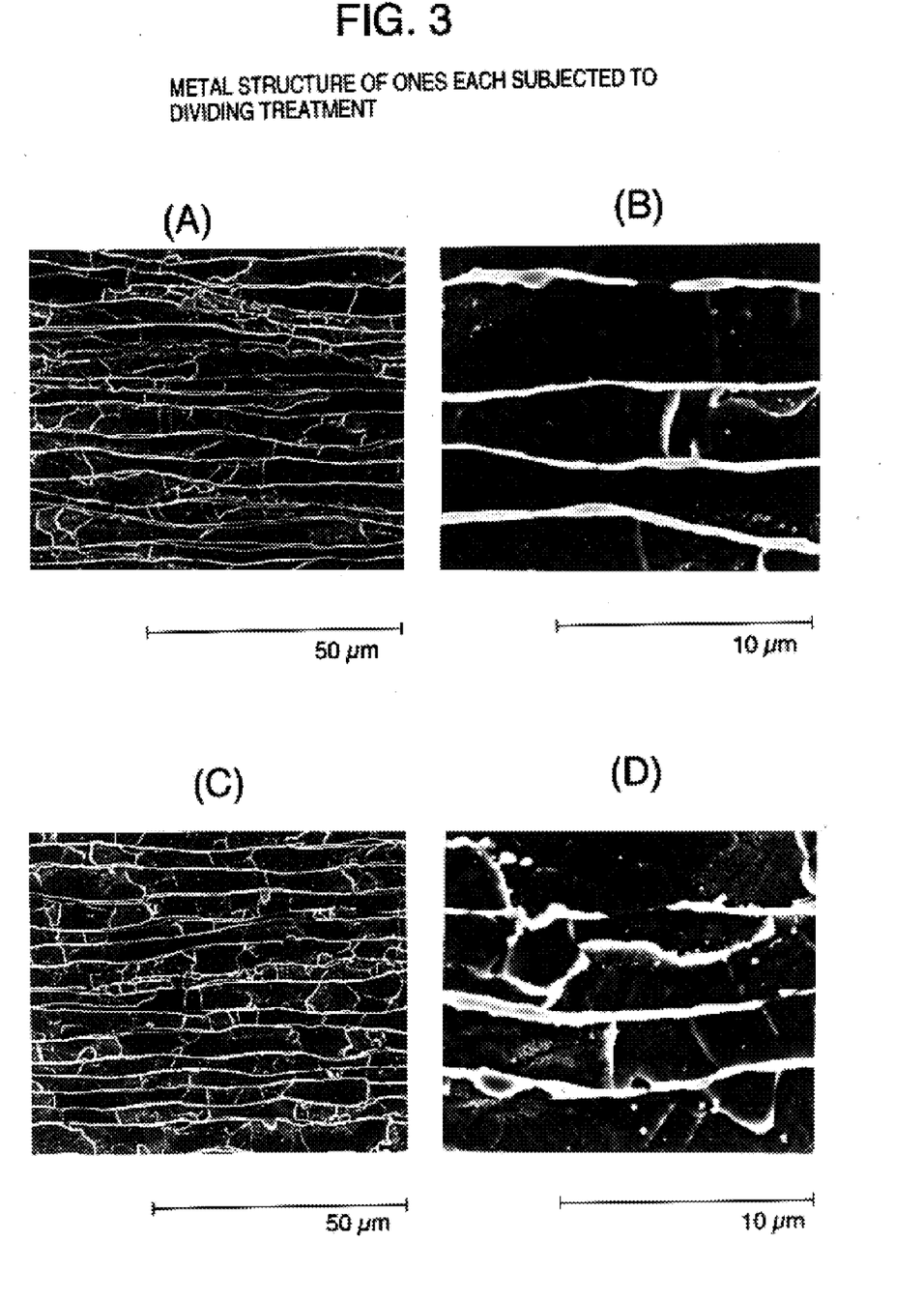
FIG. 3 is a photograph showing a metal structure of a comparative semi-hard magnetic material subjected to a dividing treatment.

To this blank of the multilayer body (1) was applied a dividing treatment (2) of 800 to 1075° C. and 60 to 180 minutes, whereby each of the Cu layers was divided. FIGS. 3A to 3D show one example thereof, in which a dividing treatment of 800° C. and 60 minutes was applied. Each of FIGS. 3A and 3B is a sectional structure taken in a rolling longitudinal direction, each of FIGS. 3C and 3D being a sectional structure taken in a rolling width direction. It is confirmed in the photographs that, in both of the longitudinal direction and the width direction, each of the Cu layers are divided at places. After the dividing treatment, cold rolling (3) was afforded as the plastic working, whereby there were obtained semi-hard magnetic materials having various thickness. Further, some of the semi-hard magnetic materials were subjected to the softening annealing (4) of 800° C. and 30 to 60 minutes after the cold rolling (3). Even by this softening annealing, the dividing of the Cu layers can be expected. After that, cold rolling (5) is performed as the cold working, whereby semi-hard magnetic material of various thickness were obtained.

From these resultant semi-hard magnetic materials, there were cut off samples for measuring magnetic characteristics (Nos. 1 to 10). Further, the steepness-affording heat treatment (6) was applied to other samples, and the magnetic characteristics thereof after the steepness-affording treatment were measured (Nos. 1 to 20).

Figure 6:
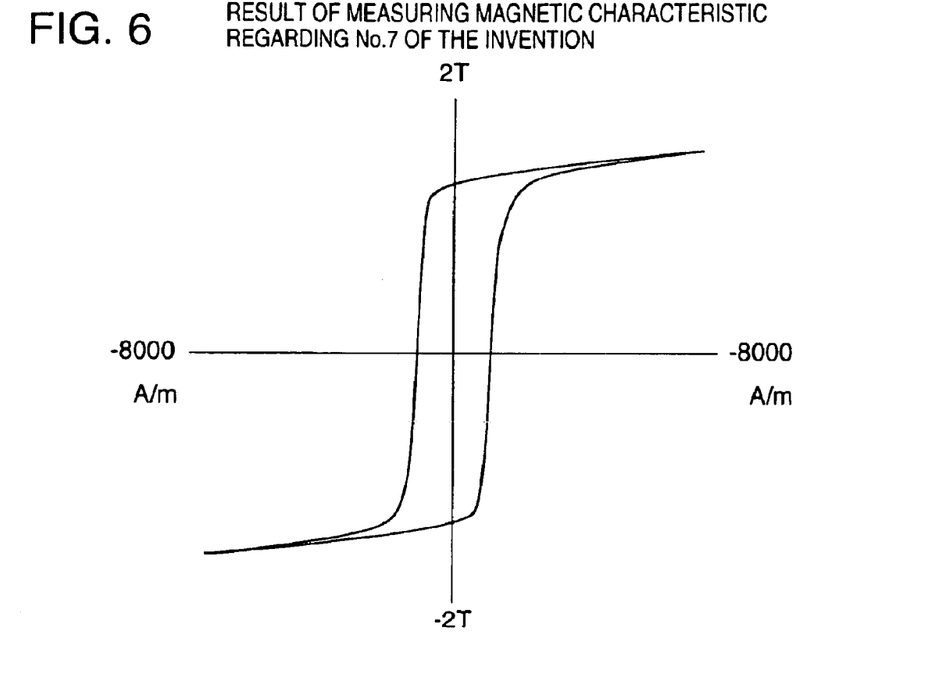
FIG. 6 is a graph showing the measurement result of the magnetic characteristic regarding a semi-hard magnetic material of the invention.
Figure 7:
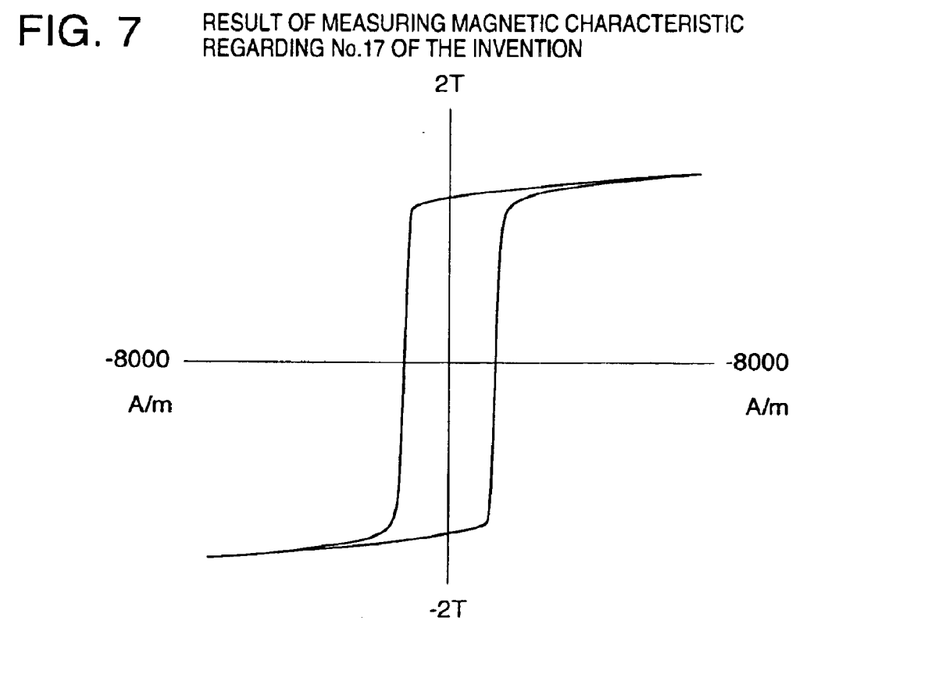
FIG. 7 is a graph showing the measurement result of the magnetic characteristic regarding another semi-hard magnetic material of the invention.
Figure 8:
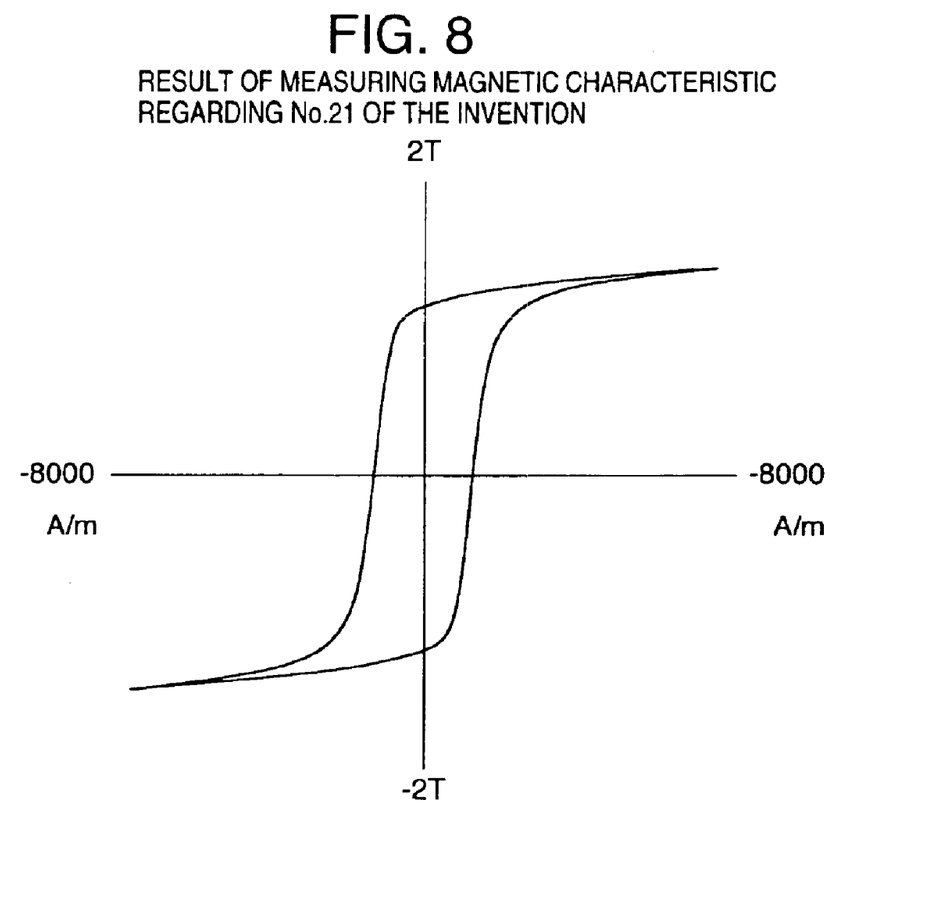
FIG. 8 is a graph showing the measurement result of the magnetic characteristic regarding still another semi-hard magnetic material of the invention.

The treatment applied to each of the samples and the measurement results of the magnetic characteristics are shown in Tables 1 and 2, respectively. As one of the measurement results, the B-H curve of the sample No. 7 is shown in FIG. 7, and the B-H curve of the sample No. 17 is shown in FIG. 8. The magnetic characteristics of the multilayer body (1) used as the blank thereof were also measured as comparative sample No. 21, the measurement results thereof being shown in Table 2, and the B-H curve thereof is shown FIG. 6.

TABLE 1

| Sample No. | dividing treatment °C. | dividing treatment minutes | cold rolling % | softening annealing (dividing treatment) °C. | softening annealing (dividing treatment) minutes | cold rolling % | steepness-affording heat treatment °C. | steepness-affording heat treatment minutes |
|---|---|---|---|---|---|---|---|---|
| 1 | 1075 | 60 | — | — | — | 80 | — | — |
| 2 | 1075 | 60 | — | — | — | 96 | — | — |
| 3 | 1075 | 60 | 80 | 800 | 30 | 88 | — | — |
| 4 | 800 | 60 | — | — | — | 80 | — | — |
| 5 | 800 | 60 | — | — | — | 98 | — | — |
| 6 | 800 | 60 | 73 | 800 | 30 | 93 | — | — |
| 7 | 800 | 60 | 80 | 800 | 30 | 91 | — | — |
| 8 | 800 | 180 | — | — | — | 80 | — | — |
| 9 | 800 | 180 | — | — | — | 98 | — | — |
| 10 | 800 | 180 | 80 | 800 | 30 | 91 | — | — |
| 11 | 1075 | 60 | — | — | — | 80 | 500 | 30 |
| 12 | 1075 | 60 | — | — | — | 96 | 500 | 30 |
| 13 | 1075 | 60 | 80 | 800 | 30 | 88 | 500 | 30 |
| 14 | 800 | 60 | — | — | — | 80 | 500 | 30 |
| 15 | 800 | 60 | — | — | — | 98 | 500 | 30 |
| 16 | 800 | 60 | 73 | 800 | 30 | 93 | 500 | 30 |
| 17 | 800 | 60 | 80 | 800 | 30 | 91 | 500 | 30 |
| 18 | 800 | 180 | — | — | — | 80 | 500 | 30 |
| 19 | 800 | 180 | — | — | — | 98 | 500 | 30 |
| 20 | 800 | 180 | 80 | 800 | 30 | 91 | 500 | 30 |
| 21 | — | — | — | — | — | — | — | — |

TABLE 2

| Sample No. | coercivity (A/m) | residual magnetic flux density Br(T) | magnetic flux density B8k(T) | squareness Br/B8k (%) | remarks |
|---|---|---|---|---|---|
| 1 | 1360 | 1.45 | 1.64 | 88.4 | the invention |
| 2 | 1320 | 1.42 | 1.70 | 83.5 | the invention |
| 3 | 1520 | 1.44 | 1.71 | 84.2 | the invention |
| 4 | 960 | 1.23 | 1.53 | 80.3 | the invention |
| 5 | 1400 | 1.34 | 1.63 | 82.2 | the invention |
| 6 | 1280 | 1.35 | 1.60 | 84.4 | the invention |
| 7 | 1320 | 1.32 | 1.59 | 83.0 | the invention |
| 8 | 960 | 1.24 | 1.53 | 81.0 | the invention |
| 9 | 1200 | 1.40 | 1.67 | 83.8 | the invention |
| 10 | 1240 | 1.37 | 1.60 | 85.6 | the invention |
| 11 | 1480 | 1.45 | 1.62 | 89.5 | the invention |
| 12 | 1600 | 1.45 | 1.64 | 88.4 | the invention |
| 13 | 2040 | 1.47 | 1.66 | 88.6 | the invention |
| 14 | 840 | 1.30 | 1.56 | 83.3 | the invention |
| 15 | 1440 | 1.41 | 1.62 | 87.0 | the invention |
| 16 | 1536 | 1.37 | 1.58 | 86.7 | the invention |
| 17 | 1480 | 1.36 | 1.58 | 86.1 | the invention |
| 18 | 800 | 1.27 | 1.53 | 83.0 | the invention |
| 19 | 1376 | 1.36 | 1.58 | 86.1 | the invention |
| 20 | 1440 | 1.37 | 1.58 | 86.7 | the invention |
| 21 | 1360 | 1.20 | 1.51 | 78.4 | comparative material |

As shown in Table 2, it is apparent that, in each of Sample Nos. 1 to 20 of the semi-hard magnetic materials according to the invention, higher squareness is obtained in comparison with the comparative sample No. 21. Also, the Br/B8k values of most of the samples of this invention exceed 80%, and some exceed 85%, and it is apparent that these samples have semi-hard magnetism preferred as the bias material of a magnetic marker. Further, in comparison with the gently curved B-H curve of the comparative sample No. 21 shown in FIG. 8, the B-H curve shown in FIG. 6 relating to the sample No. 7 of the semi-hard magnetic material according to the invention approaches a rectangular shape, and it is apparent that it has superior magnetization steepness. In addition, in comparison with the B-H curve of the sample No. 7 shown in FIG. 6, the B-H curve of the sample No. 17 shown in FIG. 7 has a shape more like a rectangle, and it is apparent that the magnetization steepness is greatly improved by the steepness-affording heat treatment.

Figure 5:
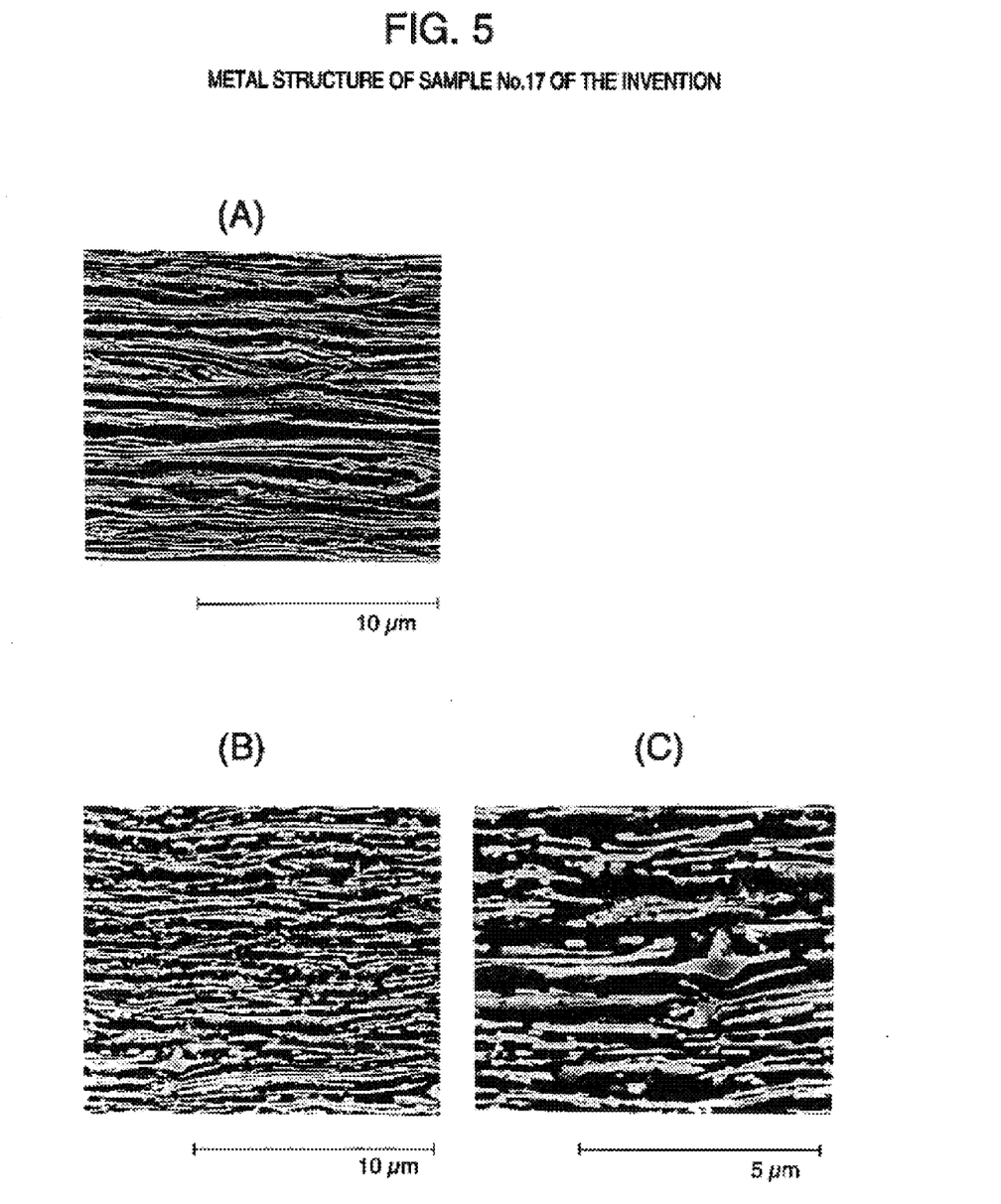
FIG. 5 is a photograph of a metal structure of still another semi-hard magnetic material of the invention.

The microstructure of the semi-hard magnetic material of the invention was observed by an electron microscope. Some of the microstructure thereof are shown in FIGS. 4A to 4C and FIGS. 5A to 5C. FIGS. 3A to 3D are the microstructures of the semi-hard magnetic material of the invention, wherein FIG. 3A is the microstructure of a section taken longitudinally in a rolling direction, and FIGS. 3B and 3C are the microstructures of sections taken transversely in the rolling direction. In each of the microstructures, it is found that, in the matrix of a dark color containing as the main component thereof Fe having magnetism, each of the layers "B" is divided which contains Cu as the main component thereof, the Cu phase being dispersed in the shape of strings or dots of white color, and that the multitudinous partially divided, sheet-like layers "B" containing Cu as the main component thereof are stacked through the layers "A" containing as the main component thereof Fe having magnetism. In these photographs, the lateral direction of each of FIGS. 3A, 4A and 5A is the longitudinal direction of the cold rolling, and the Cu phase is shown to be strings extending in this lateral direction. In each of FIGS. 3B, 3C, 4B, 4C, 5B and 5C, it is clearly shown that the layers each containing Cu as the main component thereof are divided. Thus, the Cu phase is actually in a sheet-like shape and is extended in the longitudinal direction of the cold rolling while being dispersed in the matrix containing as the main component thereof Fe having magnetism. Namely, the semi-hard magnetic material of the invention is provided, when viewing the sectional structure thereof, with such a structure as the multiple partially divided, sheet-like layers "B" containing a Cu group non-magnetic metal as the main component thereof are stacked through the layers "A" containing as the main component thereof Fe having magnetism.

FIGS. 5A to 5C are the microstructures of Sample No. 17 of the semi-hard magnetic material according to the invention. FIG. 5A is the microstructure of the longitudinal section taken in the rolling direction, and FIGS. 5B and 5C are the microstructures of the transverse sections taken widthwise of the rolling direction. From these structures, it is found that granular Cu phase exists among the partially divided layers containing Cu as the main component thereof The granular Cu is brought about from the steepness-affording heat treatment, which is deemed to be a factor of the increment of coercivity brought about after the steepness-affording heat treatment.

POSSIBILITY OF INDUSTRIAL USE

According to the production method of the invention, it becomes possible to obtain the semi-hard magnetic material having superior squareness and superior magnetization steepness and to obtain the bias material for the magnetic marker which bias material is the material of the bias element combined with the magnetostrictive element for the magnetic marker, without causing such problems as Cu agglomerates in the center portion of an alloy ingot when making the ingot by use of a conventional melting method and as the hot workability is particularly deteriorated due to the separation of Cu phase.

What is claimed is:

1. A method of producing a semi-hard magnetic material, wherein the magnetic coercive force Hc of the semi-hard magnetic material is greater than or equal to 800 A/m, which semi-hard magnetic material can maintain a magnetized state and can also be demagnetized, comprising the steps of: preparing a multilayer body in which layers "A" each consist essentially of Fe having magnetism and layers "B" each containing a non-magnetic Cu group metal as the main component thereof are stacked on each other; heating the multilayer body so that the layers "B" are segmented substantially sheet-like layers formed by a dividing heat treatment; and applying a cold plastic working to the multilayer body.

2. A method of producing the magnetic material according to claim 1, wherein the dividing heat treatment is performed at a holding temperature of 685 to 1085° C. for a holding period of 10 to 180 minutes.

3. A method of producing the magnetic material according to any one of claims 1 or 2, further comprising the step of performing, after the step of said cold plastic working, a steepness-affording heat treatment so that squareness ratio and magnetization steepness are enhanced by heating the multilayer body.

4. A method of producing the magnetic material according to claim 3, wherein the steepness-affording heat treatment for enhancing the squareness ratio and the magnetization steepness by heating is performed at a holding temperature of 400 to 700° C. for a holding period of 2 to 120 minutes.

5. A method of producing the magnetic material according to claim 1, further comprising the step of performing cold working so that the multilayer body becomes a thin sheet having a thickness of 0.03 to 1.0 mm.

6. A method of producing a semi-hard magnetic material, wherein the magnetic coercive force Hc of the semi-hard magnetic material is greater than or equal to 800 A/m, which semi-hard magnetic material can maintain a magnetized state and can also be demagnetized, comprising the steps of: preparing a multilayer body in which layers "A" each consist of Fe having magnetism and layers "B" each containing a non-magnetic Cu group metal as the main component thereof are stacked on each other; heating the multilayer body so that each of the layers "B" is partially divided by a dividing heat treatment; and applying a cold plastic working to the multilayer body.

7. A method of producing the magnetic material according to claim 6, wherein the dividing heat treatment is performed at a holding temperature of 685 to 1085° C. for a holding period of 10 to 180 minutes.

8. A method of producing the magnetic material according to any one of claims 6 or 7, further comprising the step of performing, after the step of said cold plastic working, a steepness-affording heat treatment so that squareness ratio and magnetization steepness are enhanced by heating the multilayer body.

9. A method of producing the magnetic material according to claim 8, wherein the steepness-affording heat treatment for enhancing the squareness ratio and the magnetization steepness by heating is performed at a holding temperature of 400 to 700° C. for a holding period of 2 to 120 minutes.

10. A method of producing the magnetic material according to claim 6, further comprising the step of performing cold working so that the multilayer body becomes a thin sheet having a thickness of 0.03 to 1.0 mm.

* * * * *